(12) United States Patent
Zhang (10) Patent No.: US 11,777,784 B2
(45) Date of Patent: Oct. 3, 2023

(54) INTELLIGENT NETWORK MANAGEMENT SYSTEM

(71) Applicant: BOE TECHNOLOGY GROUP CO., LTD., Beijing (CN)

(72) Inventor: Yang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 104 days.

(21) Appl. No.: 17/418,272

(22) PCT Filed: Dec. 29, 2020

(86) PCT No.: PCT/CN2020/140520
§ 371 (c)(1),
(2) Date: Jun. 25, 2021

(87) PCT Pub. No.: WO2021/169560
PCT Pub. Date: Sep. 2, 2021

(65) Prior Publication Data
US 2022/0311652 A1     Sep. 29, 2022

(30) Foreign Application Priority Data

Feb. 25, 2020 (CN) .......................... 202010114849.7
Jul. 3, 2020 (CN) .......................... 202010637437.1

(51) Int. Cl.
*H04L 41/046* (2022.01)
*H04L 41/069* (2022.01)

(52) U.S. Cl.
CPC .......... *H04L 41/046* (2013.01); *H04L 41/069* (2013.01)

(58) Field of Classification Search
None
See application file for complete search history.

(56) References Cited

U.S. PATENT DOCUMENTS 9,813,766 B2 * 11/2017 Jeon .................... H04N 21/4312
9,959,544 B2 * 5/2018 Di Luoffo .......... G06Q 30/0201
(Continued)

FOREIGN PATENT DOCUMENTS

CN    101776907 A    7/2010
CN    202217321 U    5/2012
(Continued)

OTHER PUBLICATIONS

International Search Report and Written Opinion from PCT/CN2020/140520 dated Mar. 18, 2021.
(Continued)

*Primary Examiner* — Ranodhi Serrao
(74) *Attorney, Agent, or Firm* — Calfee, Halter & Griswold LLP (57) ABSTRACT

The present disclosure relates to an intelligent network management system. The intelligent network management system includes: a plurality of terminals, including at least one management terminal and at least one application terminal; and at least one server, coupled to the management terminal and the application terminal, and including a data management circuit, a service management circuit, and an application management circuit, the management terminal being configured to send a data management signal, a service management signal and an application management signal to the server, the data management circuit performing data layer management on the application terminal in response to the data management signal, the service management circuit performing service layer management on the application terminal in response to the service management signal, and the application management circuit performing application layer management on the application terminal in response to the application management signal.

9 Claims, 6 Drawing Sheets

(56) References Cited

U.S. PATENT DOCUMENTS

| | | | |
|---|---|---|---|
| 9,965,015 B2* | 5/2018 | Im | G06F 1/3206 |
| 10,063,923 B2* | 8/2018 | Kang | H04N 21/8193 |
| 10,142,581 B2* | 11/2018 | Lee | G06F 13/4282 |
| 10,262,019 B1 | 4/2019 | Reiner | |
| 10,609,182 B2* | 3/2020 | Lu | H04W 4/70 |
| 2005/0220286 A1* | 10/2005 | Valdez | H04M 3/42263 |
| | | | 379/88.07 |
| 2017/0019717 A1* | 1/2017 | Jeon | H04N 21/41407 |
| 2017/0085948 A1* | 3/2017 | Kang | H04N 21/4432 |
| 2018/0159954 A1* | 6/2018 | Lu | H04L 67/63 |
| 2018/0322580 A1 | 11/2018 | Hsiung | |
| 2022/0294659 A1* | 9/2022 | Ansari | H04L 12/2816 |
| 2022/0311652 A1* | 9/2022 | Zhang | H04L 41/046 |

FOREIGN PATENT DOCUMENTS

| | | |
|---|---|---|
| CN | 105357503 A | 2/2016 |
| CN | 105427224 A | 3/2016 |
| CN | 105721555 A | 6/2016 |
| CN | 106203865 A | 12/2016 |
| CN | 106846216 A | 6/2017 |
| CN | 107995251 A | 5/2018 |
| CN | 105357503 B | 6/2018 |
| CN | 110020832 A | 7/2019 |
| CN | 111355790 A | 6/2020 |
| CN | 111556175 A | 8/2020 |

OTHER PUBLICATIONS

Office Action from Chinese patent application No. 202010637437.1 dated Mar. 29, 2021.
Office Action from Chinese patent application No. 202010637437.1 dated Dec. 2, 2021.

* cited by examiner

INTELLIGENT NETWORK MANAGEMENT SYSTEM

CROSS-REFERENCE TO RELATED APPLICATIONS

The present application is based upon International Application No. PCT/CN2020/140520, filed on Dec. 29, 2020, which claims priorities to the Chinese Patent Application No. 202010114849.7, titled "Intelligent Network Management System" filed on Feb. 25, 2020, and the Chinese Patent Application No. 202010637437.1, titled "Intelligent Network Management System" filed on Jul. 3, 2020, the entire contents of which are incorporated herein by reference.

TECHNICAL FIELD

The present disclosure relates to the technical field of internet of things, and in particular, to an intelligent network management system.

BACKGROUND

A financial network generally includes a plurality of terminals, such as business processing machine, intelligent navigation machine, precious metal showcase, guiding robot, and display screen. Currently, the plurality terminals of the financial network are generally managed separately, which is not conducive to the management of the plurality of terminals of the network. For a task that requires a plurality of terminals to work together, a manual operation is often required, which is not conducive to improving the efficiency of the network.

It should be noted that the information disclosed in the background section above is only for enhancing the understanding of the background of the present disclosure, and therefore may include information that does not constitute the prior art known to those with ordinary skill in the art.

SUMMARY

The present disclosure is to provide an intelligent network management system.

A first aspect of the present disclosure provides an intelligent network management system, including:
- a plurality of terminals, including at least one management terminal and at least one application terminal; and
- at least one server, coupled to the management terminal and the application terminal, and including a data management circuit, a service management circuit, and an application management circuit, the management terminal being configured to send a data management signal, a service management signal and an application management signal to the server, the data management circuit performing data layer management on the application terminal in response to the data management signal, the service management circuit performing service layer management on the application terminal in response to the service management signal, and the application management circuit performing application layer management on the application terminal in response to the application management signal.

According to an embodiment of the present disclosure, the data management circuit includes a file data management sub-circuit, a service data management sub-circuit, and an interface data management sub-circuit, wherein
- the data management signal includes a file data management signal, and the file data management sub-circuit manages file data in response to the file data management signal;
- the data management signal includes a service data management signal, and the service data management sub-circuit manages service data in response to the service data management signal; and
- the data management signal includes an interface data management signal, and the interface data management sub-circuit manages interface data in response to the interface data management signal.

According to an embodiment of the present disclosure, the service management circuit includes a log management sub-circuit, a session management sub-circuit, a function management sub-circuit, and a cache management sub-circuit, wherein
- the service management signal includes a log management signal, and the log management sub-circuit performs log management in response to the log management signal;
- the service management signal includes a session management signal, and the session management sub-circuit performs session management in response to the session management signal;
- the service management signal includes a function management signal, and the function management sub-circuit performs function management in response to the function management signal; and
- the service management signal includes a cache management signal, and the cache management sub-circuit performs cache management in response to the cache management signal.

According to an embodiment of the present disclosure, the application terminal includes:
- an information collection device, configured to collect event information and transmit collected event information to the server,
- the service management circuit further includes:
- an event engine sub-circuit, managing the application terminal in response to the event information; and
- a first rule management sub-circuit, invoking a preset rule in response to the event information to send data to the application terminal.

According to an embodiment of the present disclosure, the application management circuit includes:
- a second rule management sub-circuit, receiving the data output by the first rule management sub-circuit, and transmitting the data to the application terminal.

According to an embodiment of the present disclosure, a plurality of application terminals includes sub-application terminals in a plurality of levels, and the application management circuit includes a hierarchy management sub-circuit,
- wherein the application management signal includes a hierarchy management signal, and the hierarchy management sub-circuit selects and controls the application terminal in a corresponding level in response to the hierarchy management signal.

According to an embodiment of the present disclosure, the application management circuit includes a device management sub-circuit,
- wherein the application management signal includes a device management signal, and the device management sub-circuit controls each of the application terminals respectively in response to the device management signal.

According to an embodiment of the present disclosure, the device management sub-circuit is configured to partition the application terminal in each level, and the device management sub-circuit can query status of the application terminal through partitioning, a device number, a device name, a device type, or a device IP address.

According to an embodiment of the present disclosure, the application management circuit includes:

a split-screen management sub-circuit, controlling split-screen display of the application terminal according to content to be displayed by the application terminal.

According to an embodiment of the present disclosure, the application management circuit includes a label management sub-circuit, wherein the application management signal includes a label management signal, and the label management sub-circuit manages the application terminal associated with the label management signal in response to the label management signal.

According to an embodiment of the present disclosure, the management terminal includes a computer or a mobile terminal.

According to an embodiment of the present disclosure, the application terminal includes one or more of a computer, a mobile terminal, an intelligent robot, and an intelligent display screen.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure. Obviously, the drawings in the following description are only some embodiments of the present disclosure, and other drawings can be obtained by those with ordinary skill in the art from these drawings without creative work.

DETAILED DESCRIPTION

Example embodiments will now be described more fully with reference to the accompanying drawings. However, the example embodiments may be implemented in various forms, and should not be construed as being limited to the embodiments set forth herein; on the contrary, these embodiments are provided so that the present disclosure will be comprehensive and complete, and the concept of the example embodiments will be fully conveyed to those skilled in the art. The same reference numerals in the figures represent the same or similar structures, and thus their detailed descriptions will be omitted.

In addition, the described features, structures or characteristics may be combined in one or more embodiments in any suitable manner. In the following description, many specific details are provided so that the embodiments of the present disclosure can be understood sufficiently. However, those skilled in the art will realize that the technical solutions of the present disclosure can be practiced without one or more of the specific details, or by using other methods, components, materials, devices, steps and the like. In other cases, well-known structures, methods, devices, implementations, materials, or operations are not shown or described in detail to avoid obscuring various aspects of the present disclosure.

The block diagrams shown in the drawings are merely functional entities, and may not necessarily correspond to independent physical entities. That is, these functional entities may be implemented in the form of software, or these functional entities or a part thereof may be implemented in one or more software-hardened modules, or these functional entities may be implemented in different networks and/or processor devices and/or microcontroller devices.

Figure 1:
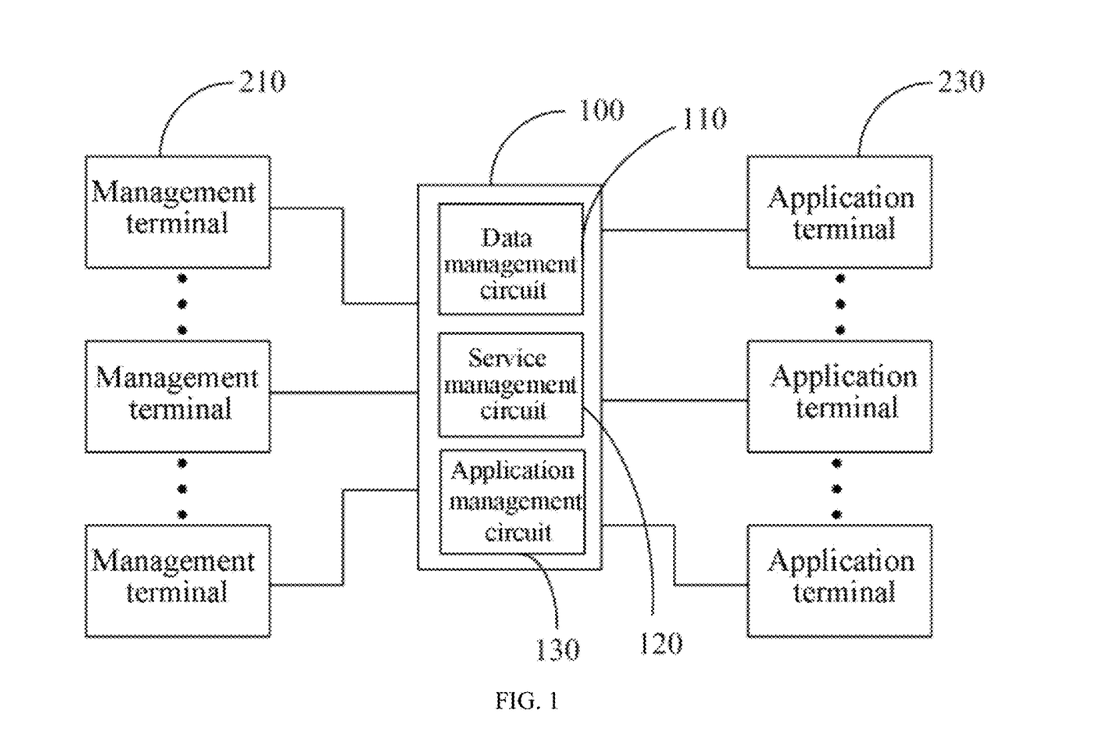
FIG. 1 is a schematic diagram of a first intelligent network management system according to an exemplary embodiment of the present disclosure.

An exemplary embodiment of the present disclosure first provides an intelligent network management system, which may be used for the management of a financial network, for example, the management of a plurality of application terminals 230 in a bank. As shown in FIG. 1, the intelligent network management system includes a plurality of terminals and at least one server 100. The plurality of terminals include at least one management terminal 210 and at least one application terminal 230. The management terminal 210 and the application terminal 230 are respectively coupled to the server 100. The server 100 includes a data management circuit 110, a service management circuit 120, and an application management circuit 130. The management terminal 210 is configured to send a data management signal, a service management signal and an application management signal to the server 100. The data management circuit 110 performs data layer management on the application terminal 230 in response to the data management signal, the service management circuit 120 performs service layer management on the application terminal 230 in response to the service management signal, and the application management circuit 130 performs application layer management on the application terminal 230 in response to the application management signal. The application terminal 230 performs front-end display according to the management of the server 100.

Figure 2:
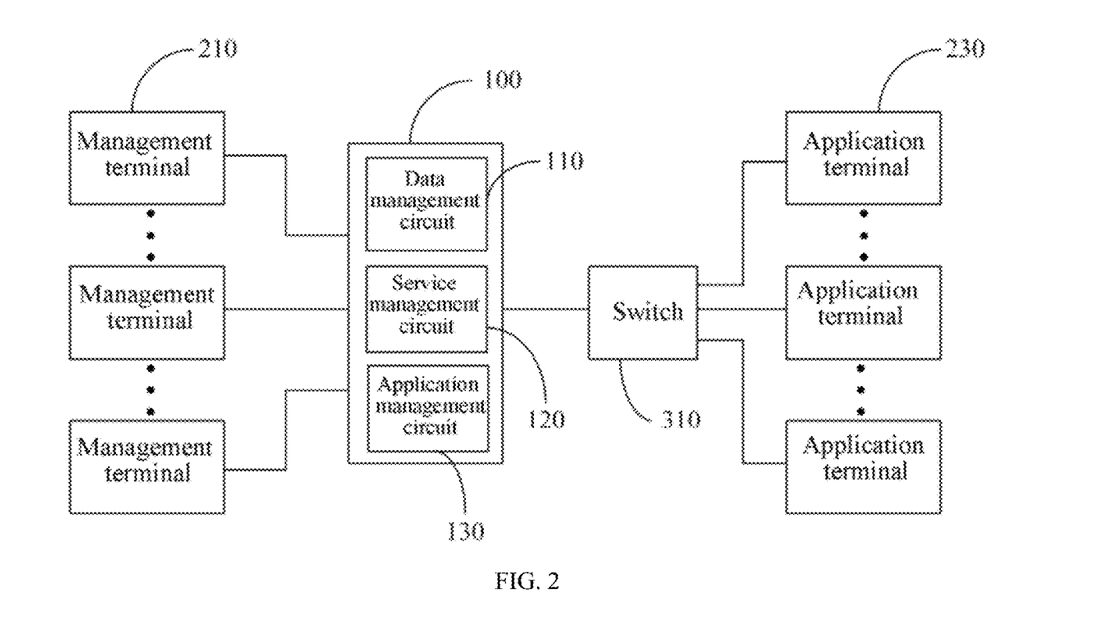
FIG. 2 is a schematic diagram of a second intelligent network management system according to an exemplary embodiment of the present disclosure.

The server 100, the application terminal 230, and the management terminal 210 may be controlled based on the internet of things, thereby implementing technologies such as interactive marketing and intelligent recommendation in the intelligent network. As shown in FIG. 2, a switch 310 is provided between the server 100 and the terminal. For example, an Ethernet switch is provided between a plurality of application terminals 230 and the server 100.

In the intelligent network management system provided by the embodiment of the present disclosure, the management terminal 210 sends the data management signal, the service management signal and the application management signal to the server 100, the data management circuit 110 performs the data layer management on the application terminal 230 in response to the data management signal, the service management circuit 120 performs the service layer management on the application terminal 230 in response to the service management signal, and the application management circuit 130 performs the application layer management on the application terminal 230 in response to the application management signal. This achieves the management of the application terminal 230 through the management terminal 210, which is beneficial to the achievement of collaborative work of the plurality of application terminals 230, thereby improving the efficiency of collaborative work of a plurality of devices in the intelligent network, and realizing the collaborative management control of the plurality of devices.

Hereinafter, each part of the intelligent network management system provided by an embodiment of the present disclosure will be described in detail.

Figure 3:
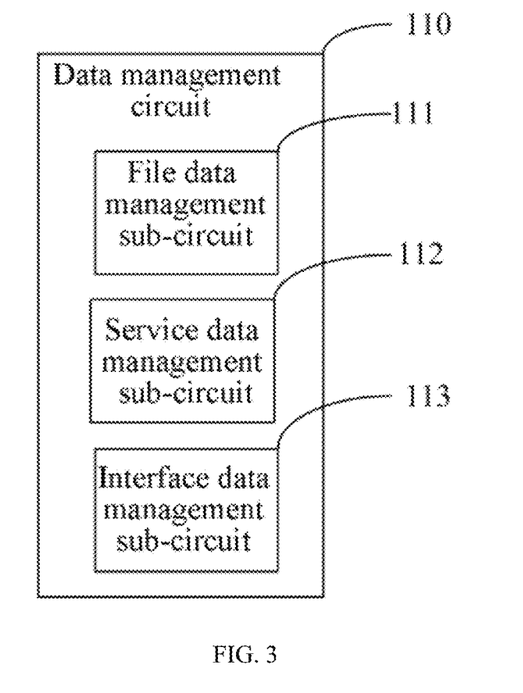
FIG. 3 is a schematic diagram of a data management circuit according to an exemplary embodiment of the present disclosure.

As shown in FIG. 3, the data management circuit 110 includes a file data management sub-circuit 111, a service data management sub-circuit 112, and an interface data management sub-circuit 113. The data management signal includes a file data management signal, and the file data management sub-circuit 111 manages file data in response to the file data management signal; the data management signal includes a service data management signal, and the service data management sub-circuit 112 manages service data in response to the service data management signal; and the data management signal includes an interface data management signal, and the interface data management sub-circuit 113 performs management on the interface data in response to the interface data management signal.

The file data management sub-circuit 111 may be a file transfer protocol (FTP) server, and a user sends the data management signal to the file data management sub-circuit 111 through the application terminal 230. The data management signal may include an upload signal and a download signal, which are used to upload data to and download data from the server 100, respectively. The file data may include a text, picture, video, office document, and the like.

The service data management sub-circuit 112 may include a relational database such as MySQL\Oracle, and the excellent characteristics of addition, deletion, modification, and query of the relational database may facilitate the maintenance and presentation of the service data. For example, the service data may be various service data of a bank.

The interface data management sub-circuit 113 may crawl public data of the intelligent network management system by connecting to an external interface provided by the intelligent network and through a crawling technology, and store the same in a management platform server. Due to data format diversification, data attribute diversification, and data un-modification, data may be storage in a data form of json, which may adapt to various special data and increase the data scalability of the system.

Figure 4:
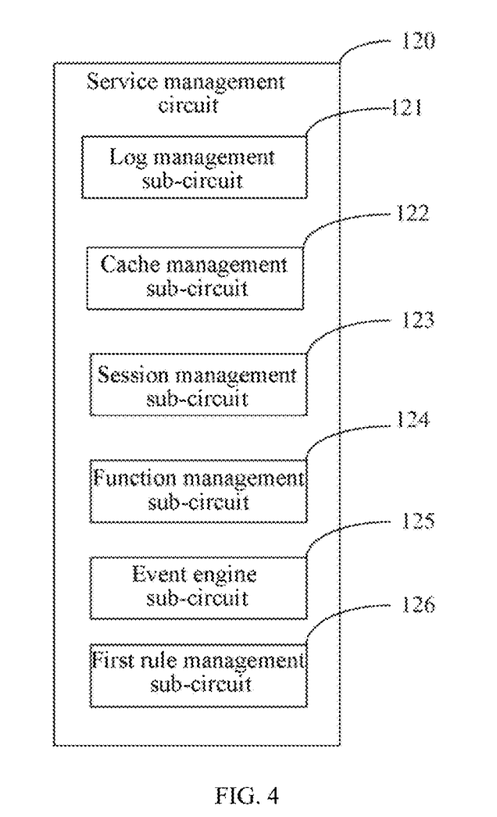
FIG. 4 is a schematic diagram of a service management circuit according to an exemplary embodiment of the present disclosure.

As shown in FIG. 4, the service management circuit 120 includes a log management sub-circuit 121, a session management sub-circuit 123, a function management sub-circuit 124, a cache management sub-circuit 122, an event engine sub-circuit 125, and a first rule management sub-circuit 126. The service management signal includes a log management signal, a session management signal, a function management signal, and a cache management signal. The log management sub-circuit 121 performs log management in response to the log management signal; the session management sub-circuit 123 performs session management in response to the session management signal; the function management sub-circuit 124 performs function management in response to the function management signal; and the cache management sub-circuit 122 performs cache management in response to the cache management signal.

The application terminal 230 includes an information collection device, such as sensor, camera, radar, and voice recognition module. The information collection device is configured to collect event information and transmit the collected event information to the server 100. The event engine sub-circuit 125 manages the application terminal 230 in response to the event information. The first rule management sub-circuit 126 invokes a preset rule to send data to the application terminal 230 in response to the event information.

On this basis, the application management sub-circuit includes a second rule management sub-circuit 134, and the second rule management sub-circuit 134 receives data output by the first rule sub-circuit, and transmits the data to the application terminal 230. The first rule management sub-circuit 126 is a rule engine in the service layer, and the second rule management sub-circuit 134 is an application layer rule management sub-circuit.

The log management sub-circuit 121 may use logback and log 4j log frameworks. The message queue uses ActiveMQ, which supports the MQTT communication protocol (publish/subscribe message protocol designed for remote devices with low hardware performance and poor network conditions). The cache management sub-circuit 122 may use Ehcache technology, which is simple and easy, and has a fast access speed and a higher efficiency. The session management sub-circuit 123 uses Apache Shiro, a powerful and easy Java security framework, to perform verification, authorization, and password and session management. The function management sub-circuit 124 may utilize the maintainable characteristic of the relational database to define the relationship between the front-end defined function list and the role through the relational database. Dynamic generation of front-end functional page may be realized, so that through setting of roles, the services of different functions for different users may be realized. The event engine sub-circuit 125 integrates external sensory devices such as infrared sensor, camera, radar, and voice recognition to obtain information from the real world for event triggering, and thus trigger the event engine to drive the execution of related service programs, and then realize decision real-time monitoring mechanism of the network. When the first rule sub-circuit implements monitoring and the event engine drives the service recommendation system, the recommendation system pushes different service information, banking products, posters, videos and other multimedia information to the display device according to the rule engine to provide clients with a better interactive experience, which provides a marketing strategy of different products promotion for different clients.

At the service layer, the service management circuit 120 may also include a system interface. The system interface may interface with an existing system of the bank through HTTP, Web Service, Socket and other network communication technologies to realize the flow of data and the landing of data value into the network.

Of course, in practical applications, the service management circuit 120 may further include a file management sub-circuit, a message queue sub-circuit, and an authority management sub-circuit. Correspondingly, the service management signal may include a file management signal, a message queue signal, and an authority management signal. The file management sub-circuit, the message queue sub-circuit and the authority management sub-circuit realize the management of a corresponding function in response to a corresponding management signal.

Figure 5:
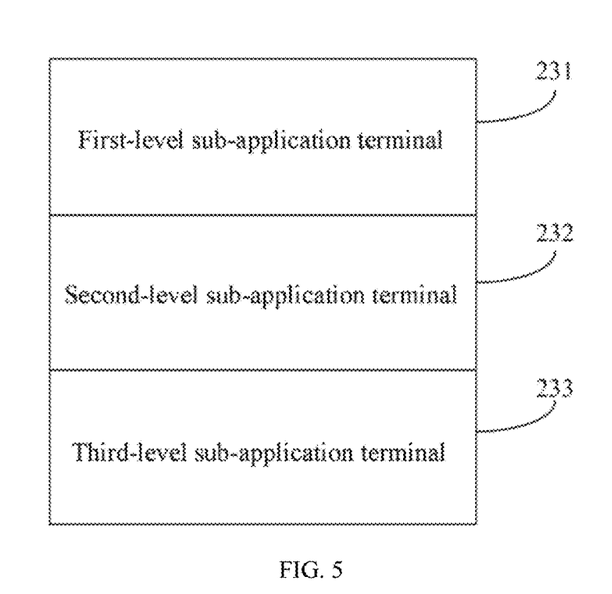
FIG. 5 is a schematic diagram of a terminal hierarchy according to an exemplary embodiment of the present disclosure.

As shown in FIG. 5, the plurality of application terminals 230 include sub-application terminals 230 in plurality of levels, and the application management circuit 130 includes a hierarchy management sub-circuit 131. The application management signal includes a hierarchy management signal, and the hierarchy management sub-circuit 131 selects and controls the application terminal 230 of a corresponding level in response to the hierarchy management signal.

For example, in practical applications, different levels of sub-application terminals 230 may be divided according to the hierarchy of financial network. For example, there are three levels divided, a first-level sub-application terminal 231 may be a bank head office terminal, a second-level sub-application terminal 232 may be a bank branch terminal, and a third-level sub-application terminal 233 may be a bank sub-branch terminal. In response to the hierarchy management signal, the hierarchy management sub-circuit 131 first selects a corresponding level, and then selects a corresponding terminal device in the corresponding level to operate the terminal device.

Figure 6:
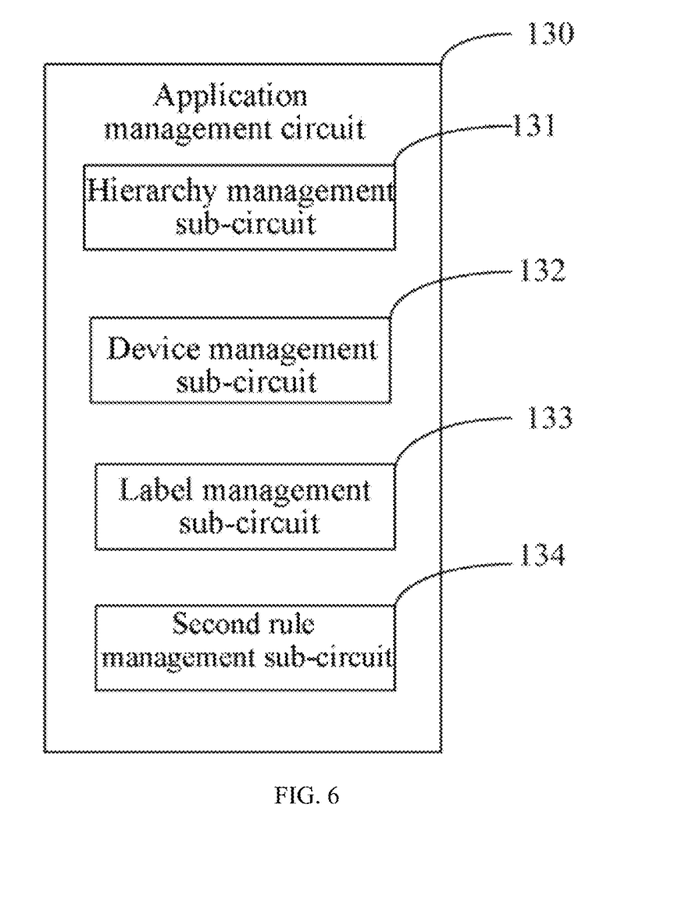
FIG. 6 is a schematic diagram of an application management circuit according to an exemplary embodiment of the present disclosure.

On this basis, as shown in FIG. 6, the application management circuit 130 includes a device management sub-circuit 132. The application management signal includes a device management signal, and the device management sub-circuit 132 controls each of the application terminals 230 respectively in response to the device management signal.

The device management sub-circuit 132 is used for the application terminal 230 to partition the application terminal 230 in each level, and the device management sub-circuit 132 can query status of the application terminal 230 through partition, a device number, a device name, a device type, or a device IP address.

When querying, the terminal device supports two forms, list form and graphics form, for querying, which can switch flexibly. In the list form display, multi-condition query is supported, query conditions include partition, device number (supporting fuzzy query), device name (supporting fuzzy query), device type, device status, client terminal status, and content of the list may include: belonging partition, device number, device name, device type, IP address, MAC address, device status, client terminal status, device icon, remarks, creator, creation time, modifier, modification time. In the graphics form display, names and statuses of various devices are displayed by partition in a plan view, and detailed information may be displayed by clicking on the icon of the device during management.

Figure 7:
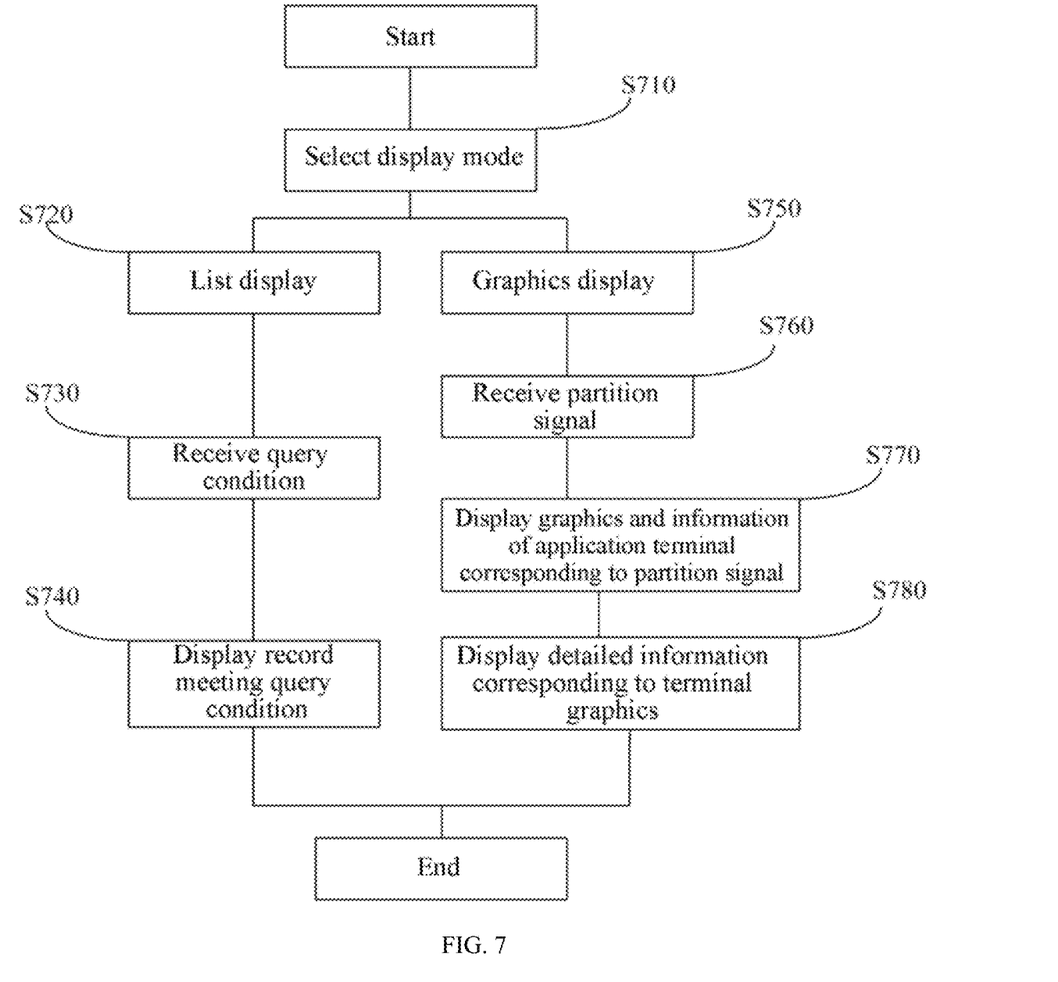
FIG. 7 is a flowchart of an application management according to an exemplary embodiment of the present disclosure.

For example, as shown in FIG. 7, after the management terminal is started, step S710 is performed on a display device of the management terminal 210 to select a display mode; a list display is performed according to the selection of a user in step 720; then step S730 is performed to receive a query condition; and finally, step S740 is performed according to the query condition to display a record that meets the query condition. The record may be a device number, device name, device type, IP address, MAC address, and device status that meet the query condition, or may be data in the device. Optionally, a graphics display may be performed according to the selection of the user in step S750; then step S760 is performed to receive a partition signal; then step S770 is performed to display graphics and information of the application terminal 230 corresponding to the partition signal; and finally, a step S780 is performed to display the detailed information corresponding to the terminal graphics.

Further, the device management sub-circuit 132 may further include a split-screen management sub-circuit and a label management sub-circuit 133, and the split-screen management sub-circuit controls the application terminal 230 to perform split-screen display according to content to be displayed by the application terminal 230. The application management signal includes a label management signal, and the label management sub-circuit 133 manages the application terminal 230 associated with the label management signal in response to the label management signal.

The label management sub-circuit 133 may customize various classification labels through the design from a label module, such as a product label, device label, client label and the like, and may be more flexible and free to quickly classify information according to responsible services and management needs. Furthermore, content management, client management, task management, knowledge management, and product management may be realized through label management: the management of program addition, deletion, modification, and check of system operation data such as content and client may be realized through the Web technology. The split-screen management sub-circuit uses xml technology to define a split-screen template, which defines screen resolution, full-screen, two-split screen, and three-split screen. When defining a program, the split-screen mode for playing and playing content of a block split-screen are selected. When the program is sent to the client device, the client device obtains the corresponding resolution parameter according to the set split-screen mode, and realizes the screen setting of a specific resolution.

Further, the application management circuit 130 may further include a client management sub-circuit, a knowledge management sub-circuit, an industrial control management sub-circuit, a content management sub-circuit, a product management sub-circuit, and a data collection sub-circuit. The above-mentioned sub-circuits implement and manage different functions through corresponding management signals.

Figure 8:
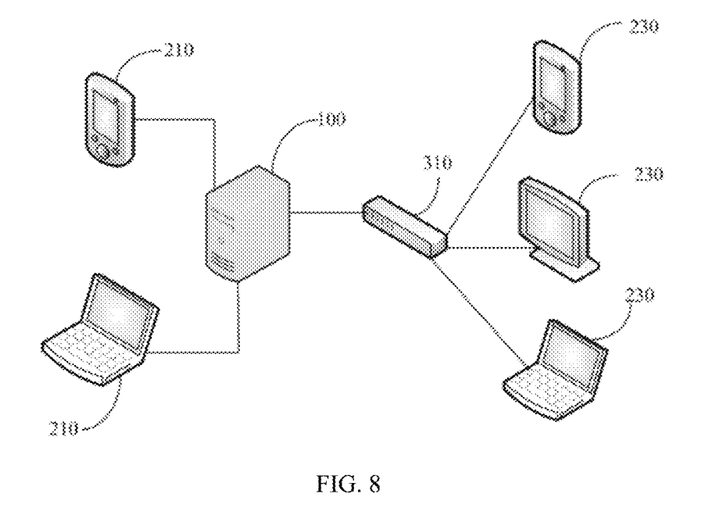
FIG. 8 is a schematic diagram of a third intelligent network management system according to an exemplary embodiment of the present disclosure.

As shown in FIG. 8, the management terminal 210 includes a computer or a mobile terminal, and the mobile terminal may include a computer or a mobile phone. The application terminal 230 includes one or more of a computer, a mobile terminal, a smart robot, and a smart display screen. The mobile terminal may include a computer or a mobile phone.

For example, the application terminal 230 in a financial network may include a hardware device such as a screen display device (a splicing screens, a posters screen, a TV screen), an interactive device (an interactive table, an interactive large screen), a light, and PC, and a mobile terminal such as a tablet.

The screen display device may include a display and a client box, and the client box (Android or Window) is provided for the screen display device. On the one hand, the server 100 sends a management signal to the client-side through the TCP protocol, and on the other hand, the client-side downloads resource file from the server 100 through the FTP protocol according to a message. The client box controls the display to play media resources according to a preset playing rule. Alternatively, the client box may buffer local playing resources, and save the playing rule locally as task.xml, program.xml, resource.xml, and the like, so that when the network or server 100 is abnormal and thus the client-side cannot be connected to the server 100, offline playing may be realized.

When the client-side is connected to the server 100, through an HTTP request, the client-side may be set to request data from the server 100 at a preset time, such as every 15 s. Of course, in actual applications, the data request time may be configured according to actual needs. If a task changes, a new task list is executed, and if there is no change, the local cache is continued to be played.

During a running process, the client-side communicates with the server 100 in real time through a socket heartbeat technology, and reports the client status and running status to the server 100. When the client-side receives an operation signal, it executes the operation. For example, when the client-side receives a screenshot signal from the server 100, it executes the screenshot program; or when the client-side receives other device system signals such as restart, mute and shutdown, the client program executes a corresponding signal to operate the device.

For various interactive devices in the intelligent network, various interactive applications are often defined in the intelligent network. The server 100 may be accessed through the interactive application, so that various resource information is maintained on the server 100, and flexible replacement of interactive content is realized.

For example, in various interactive devices in financial network of a bank, various interactive applications are often defined in the bank. The server 100 may be accessed through the interactive application, so that various resource information is maintained on the server 100, and flexible replacement of interactive content is realized.

In the interactive application, a tracking design is carried out to report to the server 100. The server 100 collects information such as client interaction event and duration, analyzes the collected data in the background, and recommends product information that may be of interest to the client through the rule engine. Through the integrated sensors of interactive devices (infrared, radar, camera, voice device and the like), the on-site events are acquired and transmitted to the server 100, and the recommendation system is driven by the event engine sub-circuit 125, and the recommendation system pushes new related products according to the defined rule engine.

In view of the increasing number of screen displays and electronic devices in the intelligent network, there are more and more demands for the control of on and off, sound, brightness and the like of various devices. Each device has its own separate control terminal, which is very troublesome, and is easy to cause loss. Through the application in the management terminal 210, signal control of lighting device, device status monitoring, device content issuing operation, and exhibition hall operation data statistical display are realized. A mobile terminal control mode for special application scenarios of the intelligent network is formed.

In the intelligent network management system provided by an embodiment of the present disclosure, a hardware device may be controlled through a serial port protocol. For example, the network-to-serial port protocol communication is realized through the technology of Ethernet to serial port. The control interface of the network may be integrated into a mobile terminal such as a tablet computer and a mobile phone, or may be arranged on the PC server 100.

In the intelligent network management system provided by the embodiment of the present disclosure, the management terminal 210 sends the data management signal, the service management signal and the application management signal to the server 100, the data management circuit 110 performs the data layer management on the application terminal 230 in response to the data management signal, the service management circuit 120 performs the service layer management on the application terminal 230 in response to the service management signal, and the application management circuit 130 performs the application layer management on the application terminal 230 in response to the application management signal. This achieves the management of the application terminal 230 through the management terminal 210, which is beneficial to the achievement of collaborative work of the plurality of application terminals 230, thereby improving the efficiency of collaborative work of a plurality of devices in the intelligent network, and realizing the collaborative management control of the plurality of devices.

It should be noted that although several circuits or sub-circuits of the intelligent network management system are mentioned in the above detailed description, this division is not mandatory. In fact, according to an embodiment of the present disclosure, the features and functions of two or more circuits or sub-circuits described above may be embodied in one circuit or sub-circuit. Conversely, the features and functions of a circuit or sub-circuit described above may be further divided into multiple circuits or sub-circuits to be embodied. Further, according to an embodiment of the present disclosure, the circuit and sub-circuit of the intelligent network management system mentioned in the above detailed description may be implemented as one or more processors or microprocessors in conjunction with corresponding software.

Those skilled in the art may understand that various aspects of the present invention may be implemented as a system, a method, or a program product. Therefore, various aspects of the present invention may be specifically implemented in the following forms, namely: a complete hardware embodiment, a complete software embodiment (including firmware, microcode, and the like), or a combination of hardware and software embodiment, which may be collectively referred to herein as "circuit", "module" or "system".

In addition, the above-mentioned drawings are merely schematic illustrations of the processing included in the method according to the exemplary embodiment of the present invention, and are not intended for limitation. It is easy to understand that the processing shown in the above drawings does not indicate or limit the time sequence of these processings. In addition, it is easy to understand that these processes can be executed synchronously or asynchronously in multiple modules, for example.

Those skilled in the art will easily conceive of other embodiments of the present disclosure after considering the specification and practicing the invention disclosed herein. The present application is intended to cover any variations, uses, or adaptive changes of the present disclosure, which follow the general principle of the present disclosure and include common knowledge or conventional technical means in the technical field that are not disclosed in the present disclosure. The description and embodiments are only regarded as exemplary, and the true scope and spirit of the present disclosure are pointed out by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. An intelligent network management system, comprising:
   a plurality of terminals, comprising at least one management terminal and at least one application terminal; and
   at least one server, coupled to the management terminal and the application terminal,
   wherein the management terminal is configured to send a data management signal, a service management signal and an application management signal to the server, and
   wherein the at least one server comprises a processor and a memory storing instructions that, when being executed by the processor, cause the processor to:
   perform data layer management on the application terminal in response to the data management signal,
   perform service layer management on the application terminal in response to the service management signal, and
   perform application layer management on the application terminal in response to the application management signal,
   wherein the at least one application terminal comprises a plurality of sub-application terminals in a plurality of levels, and the plurality of sub-application comprises a first-level sub-application terminal, a second-level sub-application terminal and a third-level sub-application terminal,
   the first-level sub-application terminal is a bank head office terminal, the second-level sub-application terminal is a bank branch terminal, and the third-level sub-application terminal is a bank sub-branch terminal, and
   the application management signal comprises a hierarchy management signal, and the instructions further cause the processor to select and control the sub-application terminal in a corresponding level in response to the hierarchy management signal, and
   wherein the instructions further cause the processor to partition the application terminal in each level, and to query status of the application terminal through a partition, a device number, a device name, a device type, or a device IP address.

2. The intelligent network management system according to claim 1, wherein
   the data management signal comprises a file data management signal, and the instructions further cause the processor to manage file data in response to the file data management signal;
   the data management signal comprises a service data management signal, and the instructions further cause the processor to manage service data in response to the service data management signal; and
   the data management signal comprises an interface data management signal, and the instructions further cause the processor to manage interface data in response to the interface data management signal.

3. The intelligent network management system according to claim 1, wherein
   the service management signal comprises a log management signal, and the instructions further cause the processor to perform log management in response to the log management signal;
   the service management signal comprises a session management signal, and the instructions further cause the processor to perform session management in response to the session management signal;
   the service management signal comprises a function management signal, and the instructions further cause the processor to perform function management in response to the function management signal; and
   the service management signal comprises a cache management signal, and the instructions further cause the processor to perform cache management in response to the cache management signal.

4. The intelligent network management system according to claim 3, wherein the application terminal comprises:
   an information collection device, configured to collect event information and transmit collected event information to the server,
   the instructions further cause the processor to:
   manage the application terminal in response to the event information; and
   invoke a preset rule in response to the event information to send data to the application terminal.

5. The intelligent network management system according to claim 1,
   wherein the application management signal comprises a device management signal, and the instructions further cause the processor to control each of the application terminals respectively in response to the device management signal.

6. The intelligent network management system according to claim 5, wherein
   the instructions further cause the processor to control split-screen display of the application terminal according to content to be displayed by the application terminal.

7. The intelligent network management system according to claim 1,
   wherein the application management signal comprises a label management signal, and the instructions further cause the processor to manage the application terminal associated with the label management signal in response to the label management signal.

8. The intelligent network management system according to claim 1, wherein the management terminal comprises a computer or a mobile terminal.

9. The intelligent network management system according to claim 1, wherein the application terminal comprises one or more of a computer, a mobile terminal, an intelligent robot, and an intelligent display screen.

* * * * *